(12) United States Patent
Na et al.

(10) Patent No.: US 8,625,542 B2
(45) Date of Patent: Jan. 7, 2014

(54) BEAMFORMING SPATIAL DE-MULTIPLEXING FOR COLLABORATIVE SPATIALLY MULTIPLEXED WIRELESS COMMUNICATION

(75) Inventors: Yanxin Na, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1090 days.

(21) Appl. No.: 12/338,514

(22) Filed: Dec. 18, 2008

(65) Prior Publication Data

US 2010/0157861 A1 Jun. 24, 2010

(51) Int. Cl.
*H04W 4/00* (2009.01)

(52) U.S. Cl.
USPC .......................... 370/334; 375/267

(58) Field of Classification Search
USPC .......... 370/208–210, 328, 329; 375/260, 299, 375/267, 346, 347
See application file for complete search history.

(56) References Cited

U.S. PATENT DOCUMENTS

| 7,532,888 | B2 | 5/2009 | Kondo |
| 7,826,560 | B2 | 11/2010 | Raleigh et al. |
| 2007/0258541 | A1 * | 11/2007 | Yamaura ...................... 375/267 |

* cited by examiner

*Primary Examiner* — Afshawn Towfighi
(74) *Attorney, Agent, or Firm* — Edell, Shapiro & Finnan, LLC (57) ABSTRACT

Techniques are provided herein to enable collaborative spatial multiplexing in a wireless communication system. At M plurality of antennas of a first wireless communication device, N plurality of spatially multiplexed transmissions are received from corresponding ones of N plurality of second wireless communication devices. The first wireless communication device produces M receive signals from the transmissions received at the M plurality of antennas. The first wireless communication device applies beamforming weight vectors to the M receive signals and in so doing produces N signals or signal streams, where N is less than or equal to M. The first wireless communication device then recovers the modulated data for each of the transmissions from the N signals.

26 Claims, 6 Drawing Sheets

BEAMFORMING SPATIAL DE-MULTIPLEXING FOR COLLABORATIVE SPATIALLY MULTIPLEXED WIRELESS COMMUNICATION

TECHNICAL FIELD

The present disclosure relates to beamforming techniques in spatially multiplexed wireless communication systems.

BACKGROUND

Spatially multiplexing in wireless communication systems involves multiple source devices simultaneously transmitting different signals in a common frequency channel to the same destination device. For example, multiple wireless mobile stations may be configured to simultaneously transmit, in the same channel, signals to a wireless base station. The wireless base station has multiple antennas on which it can receive the multiple transmissions from the multiple mobile stations. Spatial multiplexing takes advantage of the fact that there are multiple "spatial channels" between the source devices and the destination device. The spatial channels differ in their spatial signatures, but are substantially the same in frequency and time.

Collaborative spatial multiplexing is a form of spatial multiplexing where multiple spatial channels are generated through collaboration among a plurality of source devices. That is, the source devices are identified and commanded or configured to transmit at the same time (and in the same frequency channel) to the same destination device. Collaborative spatial multiplexing offers the ability to increase the capacity of a system in one direction, e.g., on uplinks from multiple wireless mobile stations to a base station. However, the challenge in designing systems with collaborative spatial multiplexing capabilities is to be able to adequately recover the data contained in each of the transmissions from the respective source devices.

DESCRIPTION OF EXAMPLE EMBODIMENTS

Overview

Techniques are provided herein to enable collaborative spatial multiplexing in a wireless communication system. At M plurality of antennas of a first wireless communication device, N plurality of spatially multiplexed transmissions are received from corresponding ones of N plurality of second wireless communication devices. The first wireless communication device produces M receive signals from the transmissions received at the M plurality of antennas. The first wireless communication device applies beamforming weight vectors to the M receive signals and in so doing produces N signals or signal streams, where N is less than or equal to M. The first wireless communication device then recovers the modulated data for each of the transmissions from the N signals.

Figure 1:
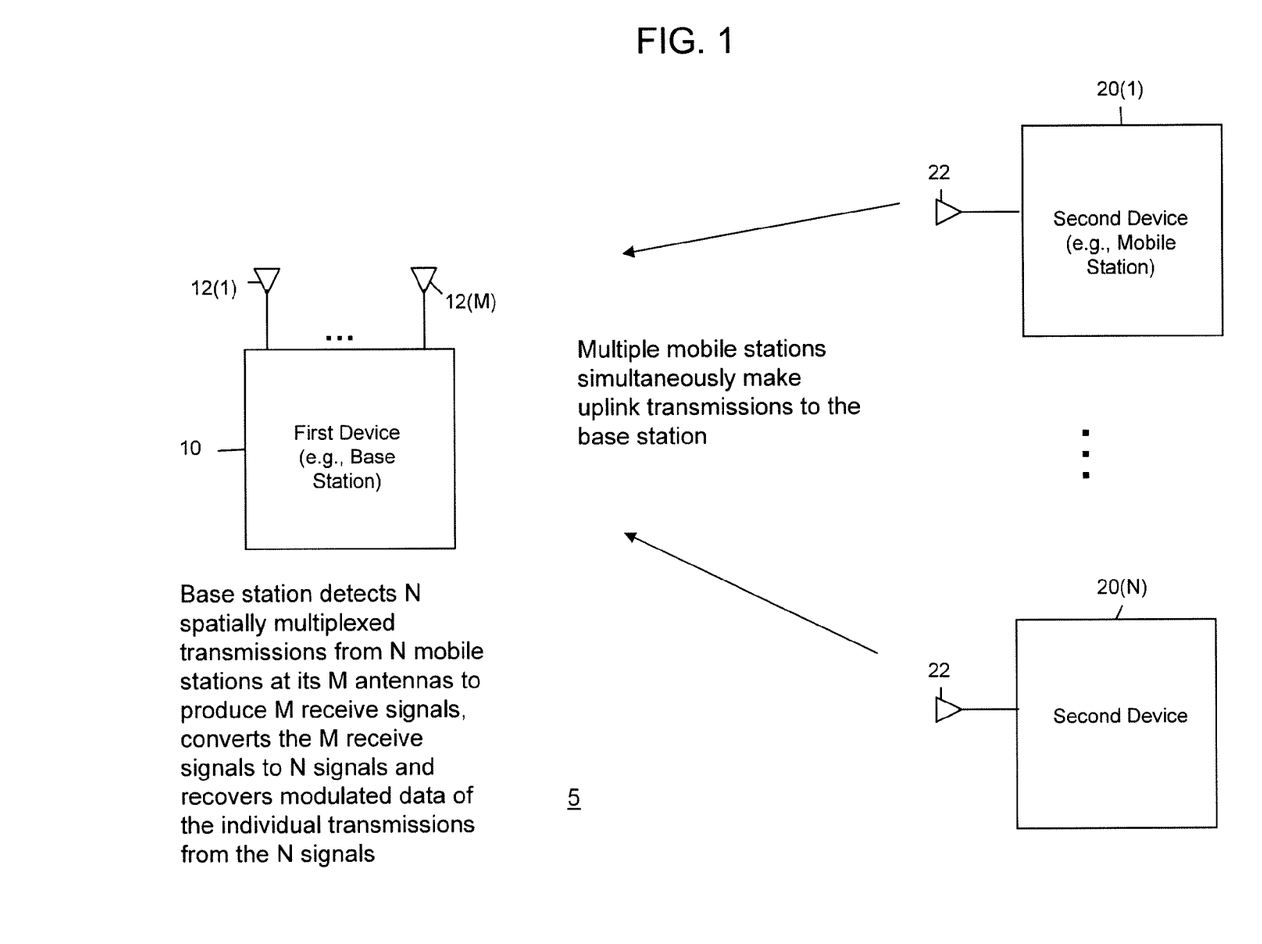
FIG. 1 is a block diagram of a wireless communication system in which a first wireless communication device is configured to perform beamforming spatial de-multiplexing of spatially multiplexed transmissions that are received from a plurality of second wireless communication devices at a plurality of antennas of the first wireless communication device.

Referring first to FIG. 1, a wireless communication system is shown generally at reference numeral 5. The system 5 comprises a first wireless communication device 10 and a plurality of second wireless communication devices 20(1)-20(N). The first wireless communication device 10 is, for example, a base station (BS) and the second wireless communication devices are, for example, mobile stations (MSs). The BS 10 and the MSs 20(1)-20(N) may be configured to communicate using the techniques of the IEEE 802.16e communication standard, also known commercially as a WiMAX™ system. The BS 10 comprises M plurality of antennas 12(1)-12(M) and each of the MSs 20(1)-20(N) comprises a single antenna 22 or is configured to transmit from a single antenna even though they may have multiple antennas for receive purposes only.

According to the techniques described herein, the MSs 20(1)-20(N) simultaneously make respective uplink transmissions in the same frequency channel to the BS 10. For a spatially multiplexed uplink communication session, the MSs 20(1)-20(N) may be viewed as N plurality of source wireless communication devices and the BS 10 viewed as a single destination wireless communication device. The N plurality of transmissions from the MSs 20(1)-20(N) are thus spatially multiplexed to the plurality of antennas 12(1)-12(M) of the BS 10. In general, the number N of second wireless communication devices participating in a collaborative uplink transmission session is less than or equal to the number M of the plurality of antennas at the BS 10. The BS 10 detects the N plurality of spatially multiplexed transmissions at its M plurality of antennas 12(1)-12(M) and produces M plurality of receive signals. The M receive signals are M copies (at the M antennas of the BS 10) of the spatially multiplexed transmissions sent by the MSs 20(1)-20(N). The BS 10 applies N beamforming weight vectors to the M receive signals to convert the M receive signals to N signals. The BS 10 then recovers the modulated data contained in each of the respective transmissions sent from the MSs 20(1)-20(N). The foregoing summarizes the basic functions that the BS 10 performs according to a beamforming spatial de-multiplexing process. The details of this process are described further hereinafter.

Figure 2:
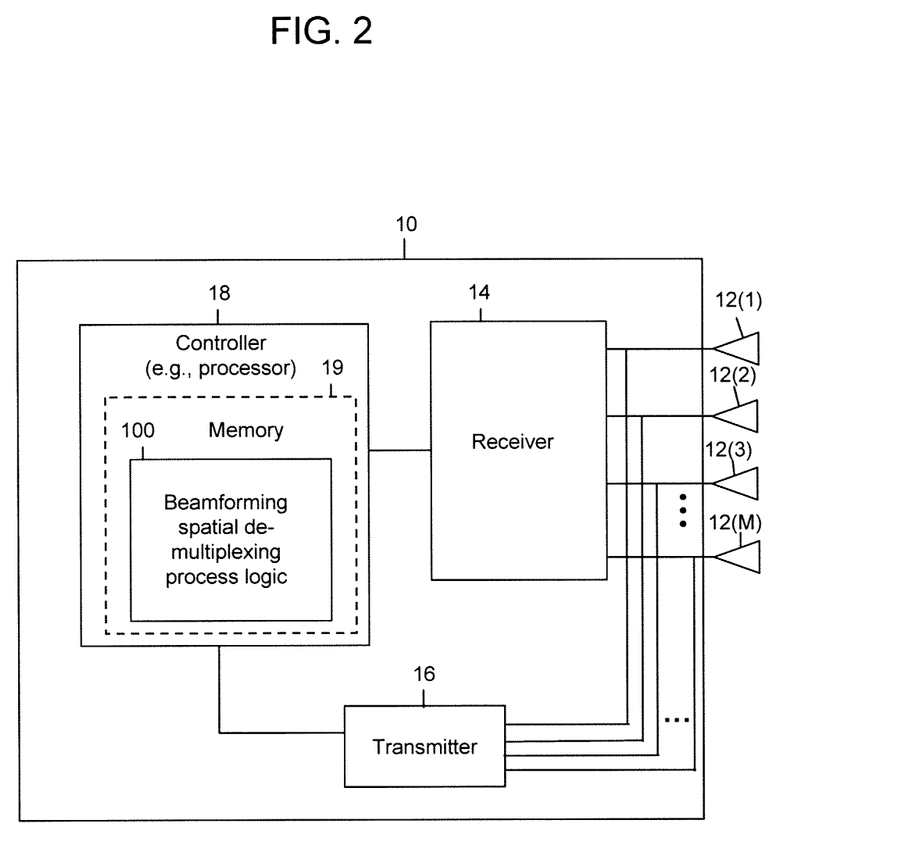
FIG. 2 is a block diagram of the first wireless communication device that is configured to perform a beamforming spatial de-multiplexing process.

Referring now to FIG. 2, an example of a block diagram of the BS 10 is described. The BS 10 comprises a receiver 14, a transmitter 16 and a controller 18. The controller 18 supplies data to the transmitter 16 to be transmitted and processes signals received by the receiver 14. In addition, the controller 16 performs other transmit and receive control functionality. Parts of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 receives the signals detected by each of the antennas 12(1)-12(M) and supplies corresponding antenna-specific receive signals to the controller 18. It is understood that the receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. The transmitter 16 may comprise individual transmitter circuits that supply respective upconverted signals to corresponding ones of a plurality of antennas 12(1)-12(M) for transmission. For simplicity, these individual transmitter circuits are not shown.

The controller 18 is, for example, a signal or data processor that comprises a memory 19 or other data storage block that stores data used for the techniques described herein. The memory 19 may be separate or part of the controller 18. Instructions associated with beamforming spatial de-multiplexing process logic 100 may be stored in the memory 19 for execution by the controller 18.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein and stores software or processor instructions that are executed to carry out the computations described herein. Thus, the process 100 may be implemented with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. For example, the controller 18 may be a modem in the BS 10 and thus be embodied by digital logic gates in a fixed or programmable digital logic integrated circuit.

Figure 3:
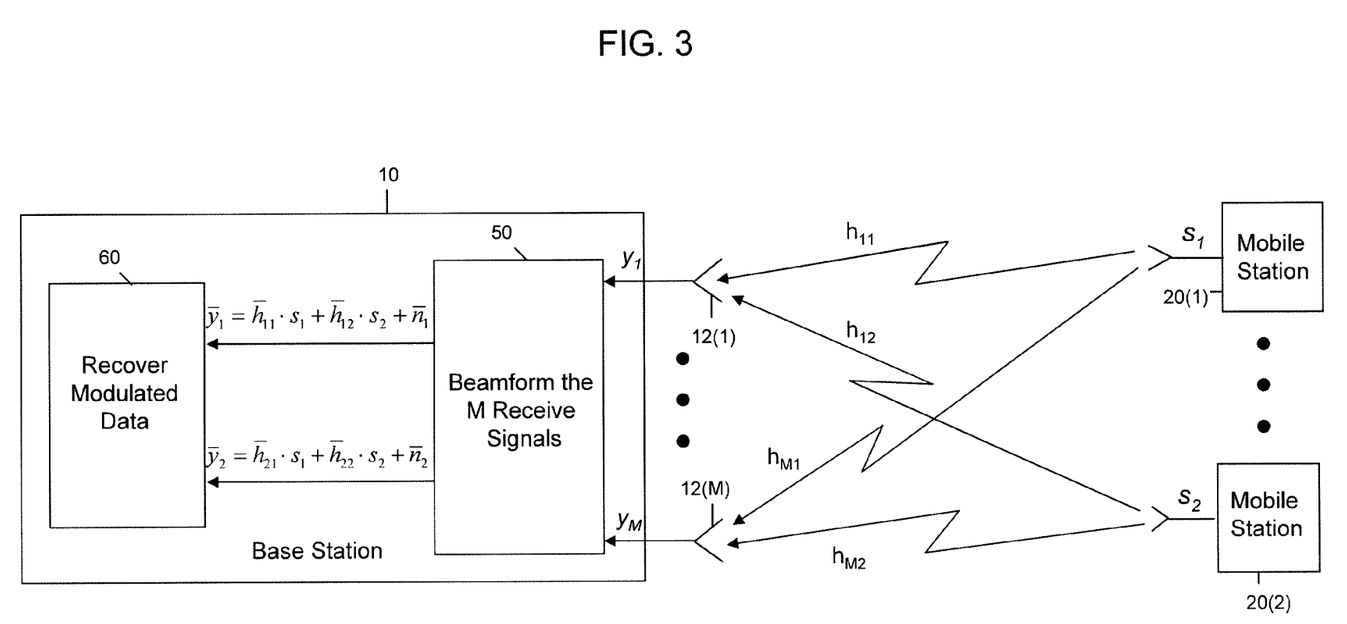
FIG. 3 is a block diagram generally depicting the signal processing associated with beamforming spatial de-multiplexing of received spatially multiplexed signals.

Turning now to FIG. 3, the beamforming spatial de-multiplexing process is generally described with respect to an example in which the BS 10 has eight antennas 12(1)-12(M), i.e., M=8, and there are two MSs 20(1) and 20(2) (i.e., N=2) that transmit signals carrying modulated data $s_1$ and $s_2$, respectively. When the MSs 20(1) and 20(2) send transmissions (overlapping in frequency and time) carrying the modulated data $s_1$ and $s_2$, respectively, the BS 10 detects the transmissions at each of its antennas. Thus, in this example, the BS 10 produces eight receive signals that represent copies of the spatially multiplexed transmissions from the MSs 20(1) and 20(2).

FIG. 3 shows an example of two MSs 20(1) and 20(2), where the over-the-air channel between the MS 20(1) and the antennas 12(1)-12(M) of the BS 10 and is represented by channel coefficients $h_{11}$-$h_{M1}$, and the over-the-air channel between the MS 20(2) and the antennas 12(1)-12(M) of the BS 10 is represented by the channel coefficients $h_{12}$-$h_{M2}$. Thus, the M receive signals may be expressed as:

$$y_1 = h_{11}^* s_1 + h_{12}^* s_2 + n_1$$

$$\ldots$$

$$y_M = h_{M1}^* s_1 + h_{M2}^* s_2 + n_M$$

where $n_1$-$n_M$ are noise vectors and $y_1$-$y_M$ are the M receive signals at the antennas 12(1)-12(M).

Block 50 represent a beamforming function performed by the BS 10 to convert the M receive signals to two signals or signal streams. In the example shown in FIG. 3, the beamforming function 50 involves applying beamforming vectors to the receive signals $y_1$-$y_M$ to produce a lesser number (e.g., two) signals $\bar{y}_1$ and $\bar{y}_2$:

$$\bar{y}_1 = \bar{h}_{11} \cdot s_1 + \bar{h}_{12} \cdot s_2 + \bar{n}_1 \text{ and } \bar{y}_2 = \bar{h}_{21} \cdot s_1 + \bar{h}_{22} \cdot s_2 + \bar{n}_2,$$

where $\bar{h}_{11}$, $\bar{h}_{12}$, $\bar{h}_{21}$, and $\bar{h}_{22}$ are estimated channel coefficients and $\bar{n}_1$ and $\bar{n}_2$ are estimated noise vectors. The M copies of the received spatially multiplexed signals provide extra spatial information and processing freedom. The beamforming weight vectors used for the beamforming function serve to suppress noise and realize an amount of beamforming gain comparable to that which would be achieved in a non-spatial multiplexing beamforming system. In addition, the signals that result from the beamforming function 50, $\bar{y}_1$ and $\bar{y}_2$ in this example, are sufficiently de-correlated such that subsequent detection and recovery of the modulated data $s_1$ and $s_2$ at block 60 can be achieved using standard computations such as maximum likelihood or minimum mean squared error. Obviously, the ideal case is when $\bar{h}_{11} = \bar{h}_{21} = 0$ and $\bar{h}_{11} = \bar{h}_{22}$.

Figure 4:
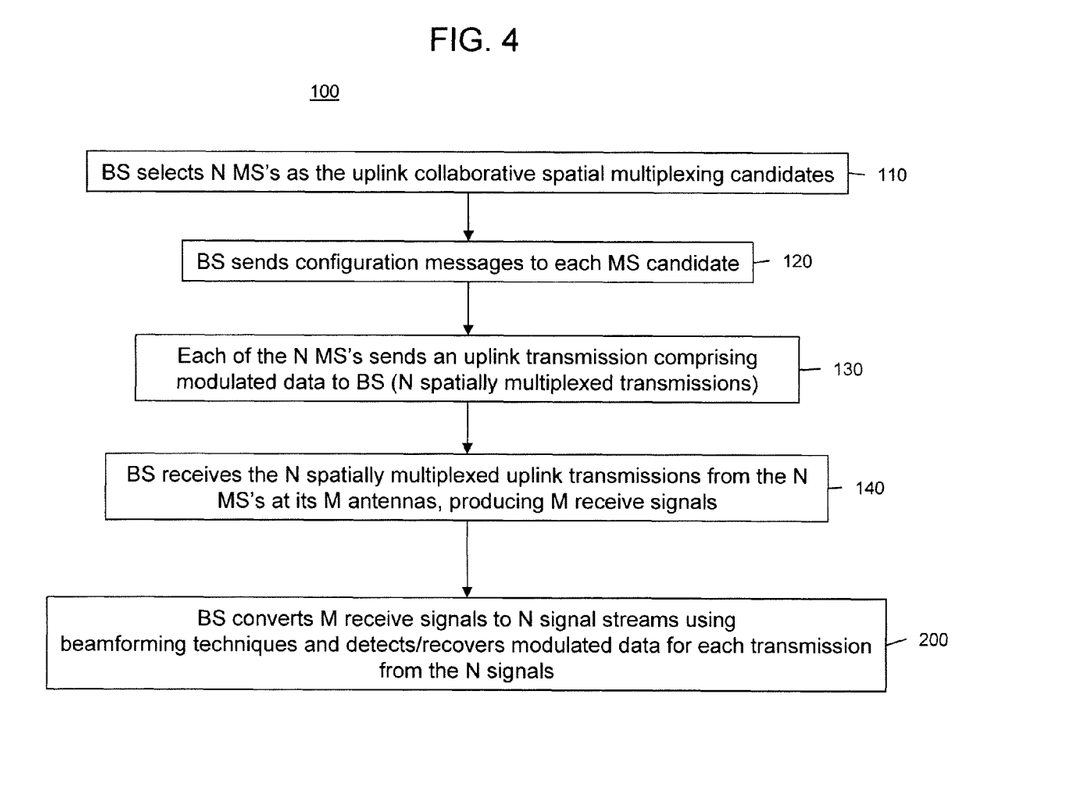
FIG. 4 is a flow chart generally depicting the beamforming spatial de-multiplexing process.

Turning to FIG. 4, an example of a flow chart for the beamforming spatial de-multiplexing process logic 100 is now described. In one example, the BS 10 initiates and coordinates the collaborative spatial multiplexed transmissions from multiple MSs 20(1)-20(N) to the BS 10. Thus, at 110, the BS 10 selects those MSs to participate in a collaborative spatial multiplexed uplink transmission to the BS 10. For example, in a WiMAX system, the BS 10 selects the MSs to be involved in a collaborative spatial multiplexed uplink communication session. The selection of the MSs to participate may be based on a variety of factors such as channel conditions between the BS 10 and the MSs, etc. The MSs may be configured to send transmissions that are formatted in accordance with orthogonal frequency division multiple access (OFDMA) techniques, where frequency subcarriers are used for individual modulation symbols representing data to be transmitted. In addition, subcarriers are allocated for pilot signals that are useful in conveying information about the over-the-air channel between the BS 10 and a MS **20(*i*). The frequency subbands occupied by the subcarriers used by each of the MSs 20(1)-20(N) overlap. However, each MS 20(1)-20(N) uses a different pattern or assignment of subcarriers for pilot signals during a collaborative spatial multiplexed uplink communication session. At 120, the BS 10** transmits configuration messages to the MSs selected to participate in a collaborative spatial multiplexing uplink communication session, where the messages define or indicate to the MSs the subcarriers that each MS should use for pilot signals so that the pilot signals in transmission from different MSs are at different subcarrier frequencies. The number of MSs involved in an uplink communication session may vary from time to time.

At 130, each of the participating MSs sends an uplink transmission (comprising modulated data that is different for each MS) to the BS 10. As explained above, these transmissions overlap in time and frequency. If there are two MSs participating in an collaborative uplink communication session, the M receive signals may be represented as $Y = [y^1 \, y_2 \, \Lambda \, y^M]^T = H_1 s_1 + H_2 s_2 + n = HD$ where $H_1$ is the channel response vector from a single antenna of a first MS to the M antennas of the BS 10, i.e., $H_1 = [h_{11} \, h_{21} \, \Lambda \, h_{M1}]^T$ and similarly $H_2$ is the channel response vector from a single antenna of a second MS to the M antennas of the BS 10, i.e., $H_2 = [h_{12} \, h_{22} \, \Lambda \, h_{M2}]^T$, $s_1$ and $s_2$ are the modulated data contained in the transmissions of the first and second MSs, respectively, the channel matrix $H = [H_1 \, H_2]$ and the modulated signal matrix $S = [s_1 \, s_2]^T$.

At 140, the BS 10 receives at its antennas 12(1)-12(M) the N plurality of spatially multiplexed uplink transmissions from the N participating MSs. In so doing, the receiver in the BS 10 produces M receive signals (one for each antenna) representing the spatially multiplexed signals received from the N participating MSs. As explained above, the spatially multiplexed uplink transmissions overlap in frequency and time.

At 200, the BS 10 converts the M receive signals to N signals, where N is the number of participating MSs in the collaborative spatially multiplexed uplink communication session. The BS 10 makes this conversion by applying (receive) beamforming weight vectors to the M receive signals. The BS 10 then recovers the modulated data in each transmission (from a corresponding participating MS) from the N signals. Further details of the beamforming conversion process 200 are described hereinafter in connection with FIG. 6.

Figure 5:
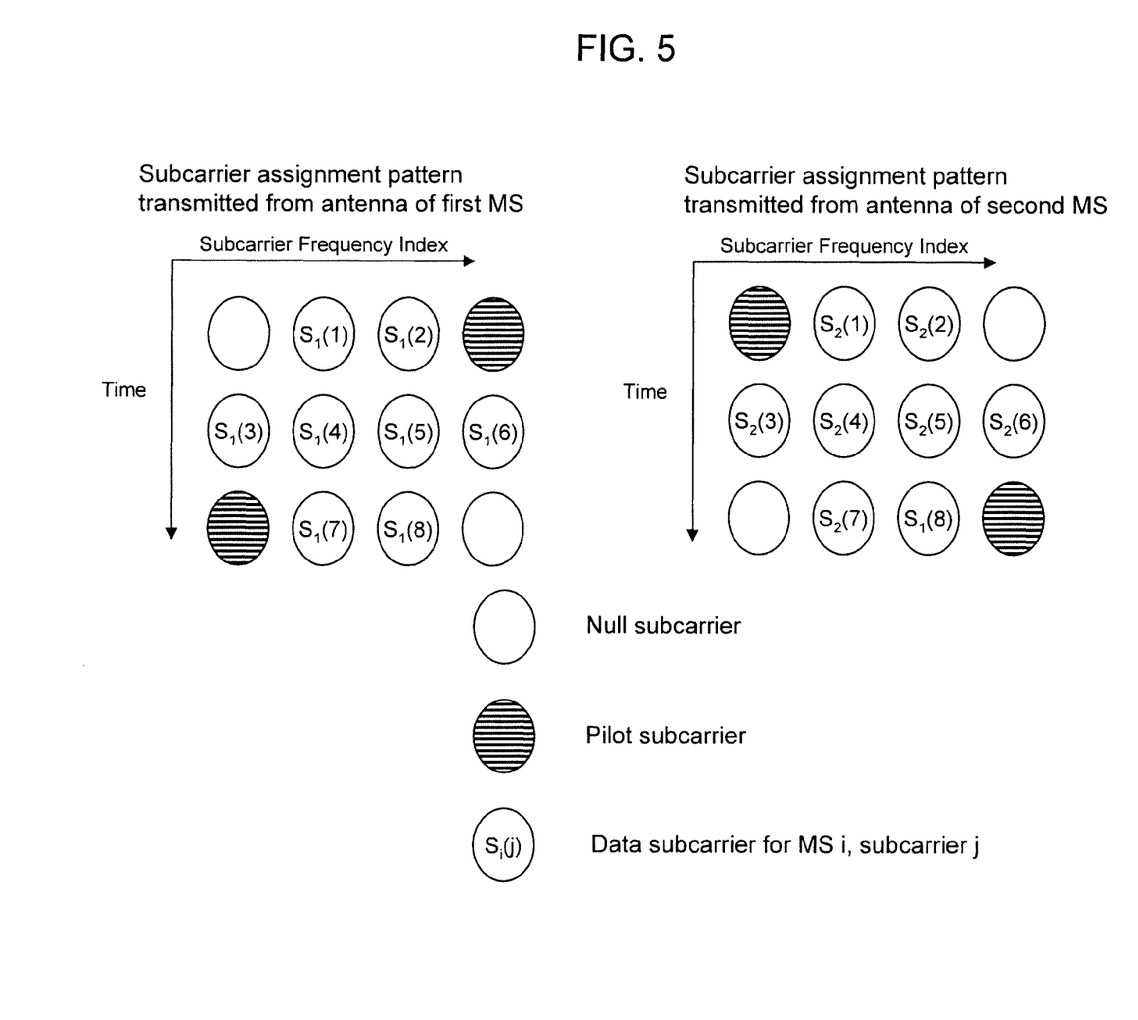
FIG. 5 is a diagram illustrating an example of a subcarrier assignment pattern for transmissions from two different second wireless communication devices.

Referring now to FIG. 5, an example of a signaling format used in a WiMAX system is described. In this example, two subcarrier allocation patterns are shown, one for a first MS and another for a second MS, where first and second MSs are participating in a collaborative spatially multiplexed uplink communication session. There are three types of subcarriers as shown in FIG. 5: data subcarriers for transmission of modulated symbols (modulated data), pilot subcarriers for transmitting known signal values for channel estimation and synchronization purposes, and null subcarriers on which no signals are transmitted because they are used as guard bands and for DC carriers. Active (data and pilot) subcarriers are grouped into subsets of subcarriers called subchannels for use in both the uplink and downlink. For example, in a WiMAX system, the minimum frequency-time resource unit of sub-channelization is one slot, which is equal to 48 data tones (subcarriers).

Furthermore, in a WiMAX system there are two types of subcarrier permutations for sub-channelization; diversity and contiguous. The diversity permutation allocates subcarriers pseudo-randomly to form a subchannel, and in so doing provides for frequency diversity and inter-cell interference averaging. The diversity permutations comprise a fully used subcarrier (FUSC) mode for the downlink and a partially used subcarrier (PUSC) mode for the downlink and the uplink.

Analogous to the cluster structure for a downlink transmission, a "tile" structure is defined for the collaborative spatial multiplexing uplink PUSC mode whose format is shown in FIG. 5. The available subcarriers in the frequency band space is split into tiles and multiple tiles, chosen from across an entire spectrum by means of a re-arranging/permutation scheme, are grouped together to form a slot. In other words, a tile is a group of data subcarriers dispersed throughout a frequency band space together with pilot subcarriers. FIG. 5 shows that the pilot signals for the first MS are allocated to different subcarriers than for the second MS, and in general, each of N MSs are allocated different subcarriers for their pilot signals. In this way, the BS 10 can derive channel and spatial signature information specific to each MS that participates in a collaborative uplink session by knowing which subcarriers the pilot signals are used for the different MSs involved in an collaborative uplink session.

Figure 6:
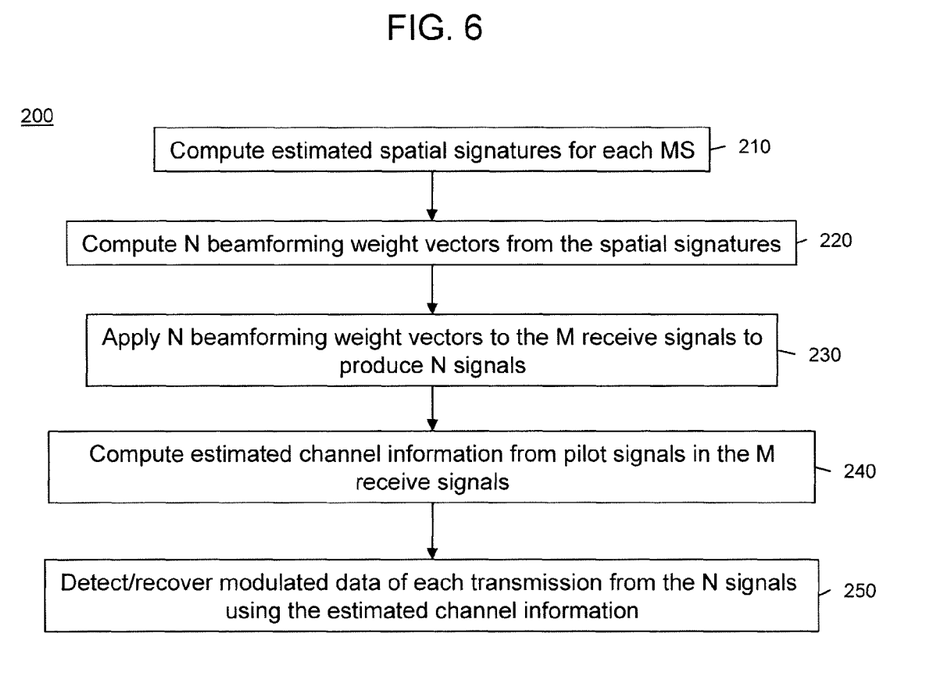
FIG. 6 is a flow chart illustrating further details of the beamforming spatial de-multiplexing process.

Turning now to FIG. 6, the conversion process 200 is now described. This process is described in connection with the example where there are two MSs participating in a collaborative spatial multiplexed uplink communication session. At 210, based on the M receive signals, the BS 10 computes estimated spatial signatures $\hat{V}_1$ and $\hat{V}_2$ for the two MSs involved in the uplink communication session. There are numerous techniques that may be used to compute the spatial signatures, such as singular value decomposition (SVD), maximum norm or maximal ratio combining.

A spatial signature for a subcarrier is an M by 1 vector. When computing the spatial signatures, the BS 10 may use all received pilot signals at the unique group of subcarriers in a transmission associated with each participating MS in order to generate one spatial signature for each participating MS. For example, the BS 10 may calculate an average of the spatial signatures across the received pilot signals for an MS transmission, or the BS 10 may compute a covariance matrix additively across the pilot signals in a transmission associated with each MS, and then compute the spatial signature for each MS from the corresponding covariance matrix. In either case, each tile has an average spatial signature.

Next, at 220, the BS 10 computes beamforming weight vectors from the spatial signatures. The number of beamforming weight vectors computed is equal to the number of MSs participating in an uplink transmission and is in general N. For example, the beamforming weight vectors may be computed using a so-called partial nulling technique, where for two MSs, the two beamforming weight vectors $W_1$ and $W_2$ are computed as:

$$W_1 = [w_{1,1}\, w_{1,2} \Lambda w_{M,1}]^T = \hat{V}_1 - \alpha \hat{V}_2^H \hat{V}_1 \hat{V}_2 / (\hat{V}_2^H \hat{V}_2) \text{ and}$$

$$W_2 = [w_{1,2}\, w_{2,2} \Lambda w_{M,2}]^T = \hat{V}_2 - \alpha \hat{V}_1^H \hat{V}_2 \hat{V}_1 / (\hat{V}_1^H \hat{V}_1),$$

where $0 < \alpha \le 1$ is a nulling factor and H is the Hermitian operation. In one example, the nulling factor $\alpha = 0.8$. In general, for N MSs the beamforming weight vectors $W_1$ to $W_N$ are computed as:

$$W_1 = [w_{1,1}\ w_{2,1}\ \Lambda\ w_{M,1}]^T$$
$$= \hat{V}_1 - \sum_{i=2}^{N} \alpha_{1i} \hat{V}_i^H \hat{V}_1 \hat{V}_i / (\hat{V}_i^H \hat{V}_i),$$

$$W_2 = [w_{1,2}\ w_{2,2}\ \Lambda\ w_{M,2}]^T$$
$$= \hat{V}_2 - \sum_{i=1, i \ne 2}^{N} \alpha_{2i} \hat{V}_i^H \hat{V}_2 \hat{V}_i / (\hat{V}_i^H \hat{V}_i),$$

$$W_n = [w_{1,n}\ w_{2,n}\ \Lambda\ w_{M,n}]^T$$
$$= \hat{V}_n - \sum_{i=1, i \ne n}^{N} \alpha_{ni} \hat{V}_i^H \hat{V}_n \hat{V}_i / (\hat{V}_i^H \hat{V}_i),$$

$$W_N = [w_{1,N}\ w_{2,N}\ \Lambda\ w_{M,N}]^T$$
$$= \hat{V}_N - \sum_{i=1, i \ne N}^{N} \alpha_{Ni} \hat{V}_i^H \hat{V}_N \hat{V}_i / (\hat{V}_i^H \hat{V}_i)$$

where $0 \le \alpha_{ni} \le 1$ is a nulling factor for $1 \le i \le N$, $1 \le n \le N$ and $V_i$ is the spatial signature for the i-th MS.

Another technique to compute the beamforming weight vectors is to set the beamforming weight vectors equal to the spatial signature vectors $\hat{V}_1$ and $\hat{V}_2$, i.e., $W_1 = \hat{V}_1$ and $W_2 = \hat{V}_2$.

Still another technique to compute the beamforming weight vectors is to first compute a covariance matrix for each MS and then select the row of each covariance matrix that has the maximum norm. This row is selected as an initial beamforming weight vector. There are N initial beamforming weight vectors. In the case of two MSs, the initial beamforming weight vectors may be denoted $W_{10}$ and $W_{20}$, respectively. The final beamforming weight vectors $W_1$ and $W_2$ are then computed as:

$$W_{21} = W_{20} / \|W_{20}\|,\ W_{11} = W_{10} / \|W_{10}\|$$

$$W_1 = W_{10} - \alpha \cdot W_{21}^H \cdot W_{10} \cdot W_{21},$$

$$W_2 = W_{20} - \alpha \cdot W_{11}^H \cdot W_{20} \cdot W_{11}$$

where α is between 0 and 1 and in one example is 0.8. The advantage of this beamforming computation technique is that it does not require computation of a matrix inversion.

Yet another technique that is useful to compute the beamforming weight vectors involves use of covariance matrices referred to above. For example, for the case of two MSs participating in a collaborative spatially multiplexed uplink transmission, the beamforming weight vectors $W_1$ and $W_2$ may be computed from the equations:

$$(\alpha \cdot R_2 + \sigma_n^2 \cdot I)^{-1} \cdot R_1 \cdot W_1 = \lambda \cdot W_1,$$

$$(\alpha \cdot R_2 + \sigma_n^2 \cdot I)^{-1} \cdot R_2 \cdot W_2 = \lambda W_2$$

where $\sigma_n$ is a noise standard deviation, I is the identity matrix, $R_1$ and $R_2$ are covariance matrices for first and second MSs, respectively, and α is a null/scaling factor that is less than 1. The beamforming weight vectors $W_1$ and $W_2$ are computed as the dominant eigenvectors of the equations above.

Next, at 230, the N beamforming weight vectors are applied to the M receive signals to produce N signals or N signal streams. In the example of two MSs, the computation at 230 may be expressed as $\bar{y}_1 = W_1^H Y$ and $\bar{y}_2 = W_2^H Y$, where $\bar{y}_1$ and $\bar{y}_2$ are the two signal streams produced as a result of applying the beamforming weight vectors to the M receive signals $Y = [y_1 \ y_2 \ \Lambda \ y_M]^T$.

At 240, the estimated channel information (matrix) H is computed using the pilot subcarriers contained in the M receive signals. The estimated channel matrix H comprises channel coefficients at each of the subcarriers of a tile and representing the channel between the antennas of the BS 10 and the antenna of each of the MSs. Thus, the channel coefficient for a subcarrier is a scalar quantity. Since the transmit values of the pilot signals are known to the BS 10, the BS 10 may compute the channel coefficients at the subcarriers of the pilot signals using that knowledge and the received signals at those subcarriers. The channel coefficients at the other subcarriers in a tile may be computed using interpolation and/or extrapolation with respect to the channel information at the pilot subcarriers. In the example of two MSs, the estimated channel coefficients are $\bar{h}_{11}$, $\bar{h}_{12}$, $\bar{h}_{21}$, and $\bar{h}_{22}$.

At 250, the estimated channel information is used to detect/recover the modulated data of the respective transmissions from the N signals. For example, in the case of two MSs, the modulated data $s_1$ and $s_2$ are computed as:

$$[s_1 \ s_2]^T = \left[\begin{bmatrix} \bar{h}_{11} & \bar{h}_{21} \\ \bar{h}_{12} & \bar{h}_{22} \end{bmatrix} + \sigma \begin{bmatrix} 1 & 0 \\ 0 & 1 \end{bmatrix}\right]^{-1} [\bar{y}_1 \ \bar{y}_2]^T,$$

where σ is a noise standard deviation.

The beamforming spatial de-multiplexing techniques described herein achieve a beamforming gain that is nearly equivalent to that obtained in a non-spatial multiplexing beamforming system. In addition, the beamforming technique de-correlates the spatially multiplexed channels so that subsequent detection and recovery of the modulated data of each transmission can be made with nearly the same performance as for a non-spatially multiplexed system.

The process for selecting which of the MSs are to participate in a collaborative spatially multiplexed uplink sessions may vary. This is the function at 110 of FIG. 4. The following are examples of selection processes. For a specific PUSC subchannel, a cross correlation of the channel information for six tiles between a first MS and all other possible or candidate MSs is computed. The maximum cross correlation of six tiles with respect to the other MSs is expressed as $\gamma_j = \max_{tiles} (|H_1^H H_j|^2 / (|H_1^H H_1| \| H_j^H H_j|))$, where $H_1$ is the channel information for the first MS and $H_j$ is the channel information for the other MSs.

When the cross correlation $\gamma_j$ is smaller than a parameter $c_1$, such as 0.3, the candidate MS with the lowest correlation is selected. In order to maintain fairness among candidate MSs, when there are multiple candidate MSs with a cross correlation smaller than $c_2$, such as 0.1, another candidate MS with low correlation may be selected by calculating the number of assigned PUSC subchannels for each MS.

In a variation to the process explained above, when there are multiple candidate MSs with the cross correlation $\gamma_j$ smaller than a parameter $c_1$, such as $c_1 = 0.1$, the candidate MS with the largest signal-to-noise ratio (SNR) is selected.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
at a first wireless communication device, receiving N plurality of spatially multiplexed transmissions at M plurality of antennas of the first wireless communication device simultaneously transmitted from corresponding ones of N plurality of second wireless communication devices, and producing M receive signals that are copies of the spatially multiplexed transmissions received at the M plurality of antennas;
applying beamforming weight vectors to the M receive signals to suppress noise in the M receive signals and producing N signals with a beamforming gain that would be achieved in non-spatially multiplexed transmissions, where N is less than or equal to M; and
recovering modulated data for each of the transmissions from the N signals.

2. The method of claim 1, and further comprising computing the beamforming weight vectors based on information derived from the M receive signals.

3. The method of claim 2, and further comprising computing a spatial signature to uniquely identify each of the N plurality of second wireless communication devices based on a unique group of subcarriers used for each of the N spatially multiplexed transmissions, and wherein computing the beamforming weight vectors comprises computing N beamforming weight vectors from the spatial signatures.

4. The method of claim 3, wherein computing the spatial signature for each of the N plurality of second wireless communication devices is based on received pilot signals for each of the N spatially multiplexed transmissions at predetermined subcarrier frequencies such that the pilot signals for the respective N spatially multiplexed transmissions are transmitted at different subcarrier frequencies.

5. The method of claim 4, wherein computing the spatial signature for each of the N plurality of second wireless communication devices comprises computing an average spatial signature from the received pilot signals at the predetermined subcarrier frequencies for each of the transmissions.

6. The method of claim 4, and further comprising computing a covariance matrix for each of the N plurality of second wireless communication devices from received pilot signals at the predetermined subcarrier frequencies for each of the transmissions, and computing the spatial signature for each of the N plurality of second wireless communication devices from the corresponding covariance matrix.

7. The method of claim 3, wherein computing the N beamforming weight vectors comprises computing beamforming weight vectors $W_1$ to $W_N$ as:

$$W_1 = [w_{1,1} \quad w_{2,1} \quad \Lambda \quad w_{M,1}]^T$$
$$= \hat{V}_1 - \sum_{i=2}^{N} \alpha_{1i} \hat{V}_i^H \hat{V}_1 \hat{V}_i / (\hat{V}_i^H \hat{V}_i),$$

$$W_2 = [w_{1,2} \quad w_{2,2} \quad \Lambda \quad w_{M,2}]^T$$
$$= \hat{V}_2 - \sum_{i=1, i \neq 2}^{N} \alpha_{2i} \hat{V}_i^H \hat{V}_2 \hat{V}_i / (\hat{V}_i^H \hat{V}_i),$$

$$W_n = [w_{1,n} \quad w_{2,n} \quad \Lambda \quad w_{M,n}]^T$$
$$= \hat{V}_n - \sum_{i=1, i \neq n}^{N} \alpha_{ni} \hat{V}_i^H \hat{V}_n \hat{V}_i / (\hat{V}_i^H \hat{V}_i),$$

$$W_N = [w_{1,N} \quad w_{2,N} \quad \Lambda \quad w_{M,N}]^T$$
$$= \hat{V}_N - \sum_{i=1, i \neq N}^{N} \alpha_{Ni} \hat{V}_i^H \hat{V}_N \hat{V}_i / (\hat{V}_i^H \hat{V}_i)$$

where $0 \leq \alpha_{ni} \leq 1$ is a nulling factor for $1 \leq i \leq N$, $1 \leq n \leq N$ and $V_i$ is the spatial signature for the i-th second wireless communication device.

8. The method of claim 3, wherein computing the spatial signature comprises computing the spatial signature based on different pilot signals that are allocated to different subcarriers for each of the N plurality of second wireless communication devices to derive unique channel information specific to each of the N plurality of second wireless communication devices.

9. The method of claim 1, and further comprising computing estimated channel information from received pilot signals in each of the transmissions received at the M plurality of antennas, and wherein recovering comprises computing estimates of modulated data for each transmission from the N signals using the estimated channel information.

10. The method of claim 9, wherein computing the estimated channel information comprises computing elements of a channel matrix representing a channel between the M plurality of antennas of the first wireless communication device and an antenna of each of the respective N plurality of second wireless communication devices.

11. An apparatus comprising:
M plurality of antennas;
a receiver configured to connect to the M plurality of antennas and to produce M plurality of receive signals that are copies of N plurality of spatially multiplexed transmissions received at the M plurality of antennas simultaneously transmitted from corresponding ones of N plurality of source wireless communication devices;
a processor configured to connect to the receiver, wherein the processor is configured to:
apply beamforming weight vectors to the M receive signals to suppress noise in the M receive signals to produce N signals with a beamforming gain that would be achieved in non-spatially multiplexed transmissions, where N is less than or equal to M; and
recover modulated data for each transmission from the N signals.

12. The apparatus of claim 11, wherein the processor is configured to compute the beamforming weight vectors based on information derived from the M receive signals.

13. The apparatus of claim 12, wherein the processor is configured to compute a spatial signature to uniquely identify each of the N plurality of source wireless communication devices based on a unique group of subcarriers for each of the N spatially multiplexed transmissions, and to compute N beamforming weight vectors from the spatial signatures.

14. The apparatus of claim 13, wherein the processor is configured to compute the spatial signature for each of the N plurality of source wireless communication devices from received pilot signals for each of the N spatially multiplexed transmissions at predetermined subcarrier frequencies such that the pilot signals for the respective N spatially multiplexed transmissions are transmitted at different subcarrier frequencies.

15. The apparatus of claim 13, wherein the processor is configured to compute a covariance matrix for each of the N plurality of source wireless communication devices from received pilot signals at predetermined subcarrier frequencies for each of the transmissions, and to compute the spatial signature for each of the N plurality of source wireless communication devices from the corresponding covariance matrix.

16. The apparatus of claim 13, wherein the processor is configured to compute the N beamforming weight vectors $W_1$ to $W_N$ by computing:

$$W_1 = [w_{1,1} \quad w_{2,1} \quad \Lambda \quad w_{M,1}]^T$$
$$= \hat{V}_1 - \sum_{i=2}^{N} \alpha_{1i} \hat{V}_i^H \hat{V}_1 \hat{V}_i / (\hat{V}_i^H \hat{V}_i),$$

$$W_2 = [w_{1,2} \quad w_{2,2} \quad \Lambda \quad w_{M,2}]^T$$
$$= \hat{V}_2 - \sum_{i=1, i \neq 2}^{N} \alpha_{2i} \hat{V}_i^H \hat{V}_2 \hat{V}_i / (\hat{V}_i^H \hat{V}_i),$$

$$W_n = [w_{1,n} \quad w_{2,n} \quad \Lambda \quad w_{M,n}]^T$$
$$= \hat{V}_n - \sum_{i=1, i \neq n}^{N} \alpha_{ni} \hat{V}_i^H \hat{V}_n \hat{V}_i / (\hat{V}_i^H \hat{V}_i),$$

$$W_N = [w_{1,N} \quad w_{2,N} \quad \Lambda \quad w_{M,N}]^T$$
$$= \hat{V}_N - \sum_{i=1, i \neq N}^{N} \alpha_{Ni} \hat{V}_i^H \hat{V}_N \hat{V}_i / (\hat{V}_i^H \hat{V}_i)$$

where $0 \leq \alpha_{ni} \leq 1$ is a nulling factor for $1 \leq i \leq N$, $1 \leq n \leq N$ and $V_i$ is the spatial signature for the i-th source wireless communication device.

17. The apparatus of claim 13, wherein the processor is configured to compute the spatial signature based on different pilot signals that are allocated to different subcarriers for each of the N plurality of source wireless communication devices to derive unique channel information specific to each of the N plurality of source wireless communication devices.

18. The apparatus of claim 11, wherein the processor is configured to compute estimated channel information from received pilot signals in each of the transmissions received at the M plurality of antennas, and to recover the modulated data by computing estimates of the modulated data for each transmission contained in the N signals using the estimated channel information.

19. The apparatus of claim 18, wherein the processor is configured to compute the estimated channel information by computing elements of a channel matrix that represents a channel between the M plurality of antennas and an antenna of each of the respective N plurality of source wireless communication devices.

20. One or more tangible non-transitory computer readable storage media storing instructions for execution by a processor and when executed operable to:
  apply beamforming weight vectors to M plurality of receive signals to suppress noise in the M receive signals to produce N signals with a beamforming gain that would be achieved in non-spatially multiplexed transmissions, wherein the M plurality of receive signals are derived from reception at M plurality of antennas of a first communication device and are copies of N plurality of spatially multiplexed transmissions simultaneously transmitted from corresponding ones of N plurality of second wireless communication devices; and
  recover modulated data for each transmission from the N signals.

21. The non-transitory computer readable storage media of claim 20, and further comprising instructions operable to compute the beamforming weight vectors based on information derived from the M plurality of receive signals.

22. The non-transitory computer readable storage media of claim 21, and further comprising instructions operable to compute a spatial signature to uniquely identify each of the N plurality of second wireless communication devices based on a unique group of subcarriers used for each of the N spatially multiplexed transmissions, and wherein the instructions operable to compute the beamforming weight vectors comprises instructions operable to compute N beamforming weight vectors from the spatial signatures.

23. The non-transitory computer readable storage media of 22, wherein the instructions operable to compute the N beamforming weight vectors comprises instructions operable to compute beamforming weight vectors $W_1$ to $W_N$ by computing:

$$W_1 = [\, w_{1,1} \quad w_{2,1} \quad \Lambda \quad w_{M,1} \,]^T$$

$$= \hat{V}_1 - \sum_{i=2}^{N} \alpha_{1i} \hat{V}_i^H \hat{V}_1 \hat{V}_i / (\hat{V}_i^H \hat{V}_i),$$

$$W_2 = [\, w_{1,2} \quad w_{2,2} \quad \Lambda \quad w_{M,2} \,]^T$$

$$= \hat{V}_2 - \sum_{i=1, i\neq 2}^{N} \alpha_{2i} \hat{V}_i^H \hat{V}_2 \hat{V}_i / (\hat{V}_i^H \hat{V}_i),$$

$$W_n = [\, w_{1,n} \quad w_{2,n} \quad \Lambda \quad w_{M,n} \,]^T$$

$$= \hat{V}_n - \sum_{i=1, i\neq n}^{N} \alpha_{ni} \hat{V}_i^H \hat{V}_n \hat{V}_i / (\hat{V}_i^H \hat{V}_i),$$

$$W_N = [\, w_{1,N} \quad w_{2,N} \quad \Lambda \quad w_{M,N} \,]^T$$

$$= \hat{V}_N - \sum_{i=1, i\neq N}^{N} \alpha_{Ni} \hat{V}_i^H \hat{V}_N \hat{V}_i / (\hat{V}_i^H \hat{V}_i)$$

where $0 \leq \alpha_{ni} \leq 1$ is a nulling factor for $1 \leq i \leq N$, $1 \leq n \leq N$ and $V_i$ is the spatial signature for the i-th second wireless communication device.

24. The non-transitory computer readable storage media of claim 22, wherein the instructions operable to compute the spatial signature comprise instructions operable to compute the spatial signature based on different pilot signals that are allocated to different subcarriers for each of the N plurality of source wireless communication devices to derive unique channel information specific to each of the N plurality of source wireless communication devices.

25. The non-transitory computer readable storage of claim 20, and further comprising instructions operable to compute estimated channel information from received pilot signals in each of the transmissions received at the M plurality of antennas, and wherein the instructions operable to recover instructions operable to compute estimates of modulated data for each transmission from the N signals using the estimated channel information.

26. The non-transitory computer readable storage of claim 25, wherein the instructions operable to compute the estimated channel information comprises instructions operable to compute elements of a channel matrix representing a channel between the M plurality of antennas of the first wireless communication device and an antenna of each of the respective N plurality of second wireless communication devices.

* * * * *